(12) United States Patent
Katakura et al.

(10) Patent No.: US 6,560,522 B2
(45) Date of Patent: May 6, 2003

(54) DRIVING FORCE CONTROL APPARATUS

(75) Inventors: Shusaku Katakura, Yokosuka (JP);
Masahiro Iriyama, Yokohama (JP);
Munetoyo Ikeda, Yokohama (JP);
Daisuke Yoshinoya, Zama (JP)

(73) Assignee: Nissan Motor, Co., Ltd., Yokohama (JP)

(*) Notice: Subject to any disclaimer, the term of this patent is extended or adjusted under 35 U.S.C. 154(b) by 0 days.

(21) Appl. No.: 10/022,575

(22) Filed: Dec. 20, 2001

(65) Prior Publication Data
US 2002/0082760 A1 Jun. 27, 2002

(30) Foreign Application Priority Data
Dec. 26, 2000 (JP) .......................... 2000-395224

(51) Int. Cl.⁷ .............................................. F02D 29/02
(52) U.S. Cl. ........................... 701/54; 701/55; 701/63; 701/58; 477/73; 477/122; 180/170
(58) Field of Search ................. 701/54, 55, 57, 701/51, 95, 66, 60, 58, 93, 94, 63; 477/107, 98, 122, 54, 73, 123, 125; 123/406.23; 180/170, 171

(56) References Cited

U.S. PATENT DOCUMENTS 4,735,114 A * 4/1988 Satoh et al. ............... 74/866
6,023,647 A * 2/2000 Saito et al. ................ 701/57
6,151,542 A   11/2000 Yoshino et al.
6,188,943 B1 * 2/2001 Uchida et al. ............. 701/54
6,330,504 B1 * 12/2001 Toukura et al. ........... 701/54
6,389,348 B1 * 5/2002 Takagi et al. .............. 701/58

FOREIGN PATENT DOCUMENTS

| JP | 6-87356 A | 3/1994 |
| JP | 9-267664 A | 10/1997 |
| JP | 2000-79838 A | 3/2000 |

* cited by examiner

Primary Examiner—Thomas G. Black
Assistant Examiner—Tuan C To
(74) Attorney, Agent, or Firm—Shinjyu Global IP Counselors, LLP

(57) ABSTRACT

A driving force control apparatus is configured to prevent degradation of acceleration performance and the occurrence of large torque shock when shifting from the non-execution to the execution of a driving force control operation. A first target driving force is selected when the driving force control operation is being executed and a second target driving force is selected when the driving force control operation is not being executed. When shifting from the execution to the non-execution, the shifting target driving force is calculated such that the driving force shifts slowly. When accelerating from rest or a slow speed, the speed at which the driving force control operation shifts into the execution mode is increased as the accelerator position becomes larger.

16 Claims, 12 Drawing Sheets

DRIVING FORCE CONTROL APPARATUS

BACKGROUND OF THE INVENTION

1. Field of the Invention

The present invention generally relates to a driving force control apparatus for a vehicle. More specifically, the present invention relates to a driving force control apparatus that prevents degradation of acceleration performance and the occurrence of large torque shock when shifting from the non-execution to the execution of a driving force control operation.

2. Background Information

Japanese Laid-Open Patent Publication No. 2000-79838 describes a driving force control apparatus that sets a target driving force based on the driving conditions of a vehicle and controls the torque generated by the engine such that this target driving force is achieved. In this publication, the driving force control operation is not executed when the idle switch is ON because there are regions where it is preferable in terms of operability not to execute driving force control operation, such as when the accelerator pedal has been released (the idle switch ON). When driving force control operation is not executed, the driving force outputted as a result of the engine torque obtained from the accelerator pedal depression amount and the engine speed is taken as a second target driving force. When the vehicle shifts to the execution of driving force control operation, the shifting target driving force is calculated using delay processing such that the target driving force shifts gradually from the second target driving force to a first target driving force that is established based on the driving conditions of the vehicle. As a result, the drive torque changes smoothly during shifting and large torque shock does not occur.

In view of the above, there exists a need for an improved driving force control apparatus for a vehicle. This invention addresses this need in the art as well as other needs, which will become apparent to those skilled in the art from this disclosure.

SUMMARY OF THE INVENTION

It has been discovered that several disadvantages occur when the drive torque is changed smoothly during shifting of the driving force control operation from the non-execution mode to the execution mode as a consequence of always calculating the target driving force using delay processing during the shifting.

Specifically, since a large driving force is required when a vehicle starts to move, the starting acceleration performance can be improved over that of a vehicle not equipped with a driving force control apparatus by setting the first target driving force, which is the target driving force used when in the driving force control execution mode, to a large value. However, with the aforementioned publication, the driving force control apparatus shifts from the non-execution mode to the execution mode when the accelerator pedal is depressed and the vehicle is made to start from a stopped condition in which the accelerator pedal was released. Consequently, the effect of improving the starting acceleration performance cannot be fully realized because it takes time for the shifting target driving force to reach the first target driving force.

Therefore, in addition to making the drive torque change smoothly during shifting of the driving force control operation from the non-execution mode to the execution mode so that large torque shock does not occur, this invention increases the shifting speed during starting in order to improve the starting acceleration performance.

The first invention is a vehicle driving force control apparatus comprising at least one sensing device, a determining section, a switching section, a first target driving force computing section, a first target torque computing section, a second target torque computing section, a selecting section, an engine output torque controlling device, a second target driving force computing section, a shifting target driving force computing section, and a shift controlling section. The at least one sensing device is configured to detect at least one driving condition of a vehicle. The determining section is configured to determine if a driving force control operation should be executed based on the at least one driving condition detected by the at least one sensing device. The switching section is configured to switch to between an execution mode and a non-execution mode of the driving force control operation based on a result of the determining section. The first target driving force computing section is configured to calculate a first target driving force based on the at least one driving condition detected by the at least one sensing device. The first target torque computing section is configured to calculate a first target torque based on the first target driving force and the at least one driving condition detected by the at least one sensing device. The second target torque computing section is configured to calculate a second target torque based on engine speed and the at least one driving condition detected by the at least one sensing device. The selecting section is configured to select the first target torque when the switching section switches to the execution mode of the driving force control operation and the second target torque when the switching section switches to the non-execution mode of the driving force control operation. The engine output torque controlling device is configured to control engine output torque based on which of the first and second target torques has been selected by the selection section. The second target driving force computing section is configured to calculate a second target driving force that is obtained when the second target torque has been selected by the selection section. The shifting target driving force computing section is configured to calculate a shifting target driving force to gradually shift from the second target driving force to the first target driving force when the driving force control operation is shifted from the non-execution mode to the execution mode. The shift controlling section is configured to switch from the second target driving force to the shifting target driving force when the driving force control operation is shifted from the non-execution mode to the execution mode. The shift controlling section is being further configured to increase shifting speed of the shifting target driving force in response to an increase in an accelerator pedal depression amount upon detection of the vehicle starting to move.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
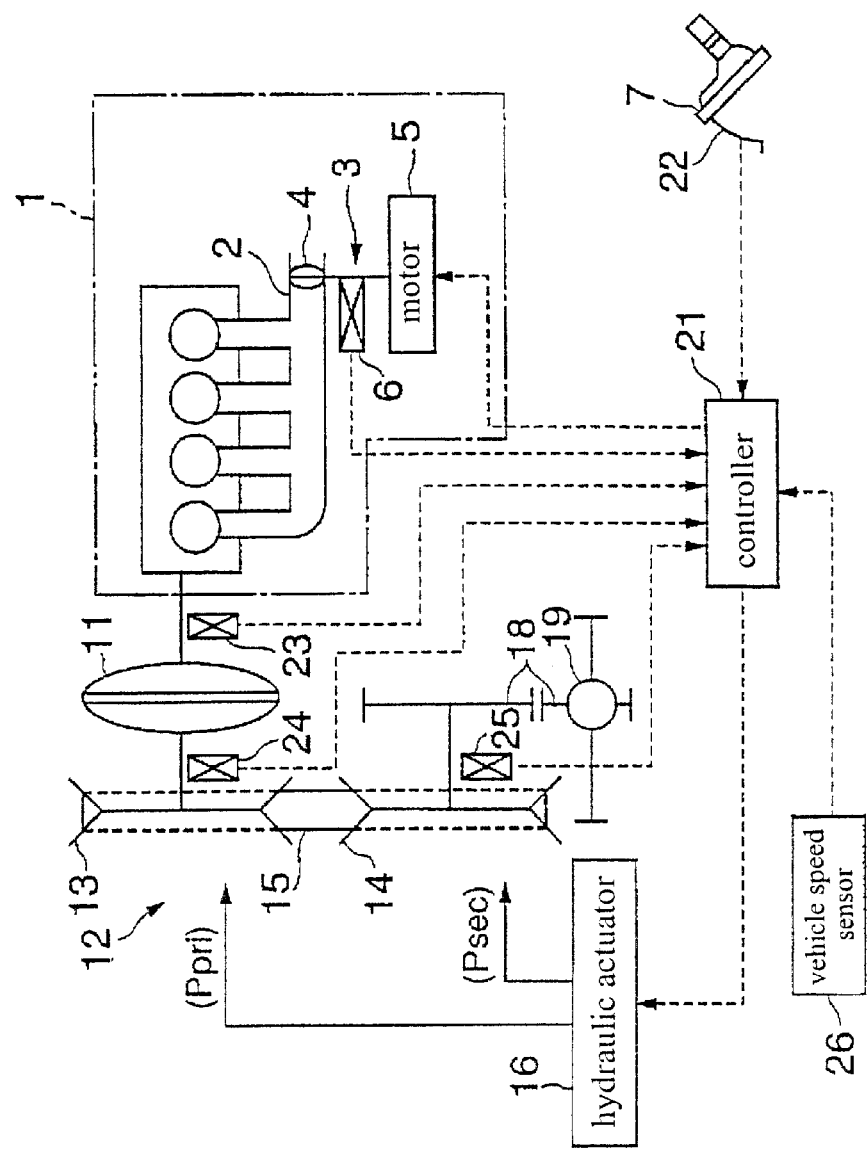
FIG. 1 is a schematic block diagram of a vehicle equipped with a vehicle driving force control apparatus in accordance with a first embodiment of the present invention.

Referring initially to FIG. 1, a schematic block diagram of a vehicle equipped with a vehicle driving force control apparatus is illustrated to explain a first embodiment of the present invention. Specifically, FIG. 1 shows the power train and the control system thereof for a vehicle equipped with a driving force control apparatus that embodies the present invention.

An engine 1 has an intake passage 2 in which an electronically controlled throttle device 3 opens and closes a throttle valve 4 using a motor 5 disposed inside the intake passage 2 of the engine 1. The throttle valve 4 is driven such that the actual throttle opening detected by a throttle sensor 6 matches a target throttle opening command issued from a control unit or controller 21. Determined in this manner, the throttle opening of the throttle valve 4 adjusts the amount of air taken into the engine and controls the output torque of the engine 1.

This engine output torque is transmitted to a well known V-belt type continuously variable transmission 12 (CVT) via a torque converter 11 that serves as a device to engage and disengage power in a conventional manner. The output torque from the continuously variable transmission 12 is transmitted to drive wheels (not shown) via a final drive gear 18 and a differential gear 19.

The continuously variable transmission 12 is equipped with a primary pulley 13, a secondary pulley 14 disposed in alignment with the primary pulley 13, and a V-belt 15 disposed around the pulleys 13 and 14. For the purpose of changing gears, the flanges that form the V-groove of the primary pulley 13 and the V-groove of the secondary pulley 14, respectively, comprise a moveable flange and a stationary flange. The moveable flange can move toward the stationary flange to narrow the V-groove or away from the stationary flange to widen the V-groove. The actual gear ratio of the continuously variable transmission 12 is changed to match the target gear ratio by displacing both moveable flanges to positions that correspond to a primary pulley pressure Ppri and a secondary pulley pressure Psec provided by a hydraulic actuator 16, which operates in response to a target gear ratio command.

The following signals are fed to the controller 21: the accelerator position, the rotational speed of the engine 1, the CVT input shaft rotational speed, the CVT output shaft rotational speed, and the vehicle speed. The accelerator position is preferably detected using an accelerator sensor 22 that determines the depression amount of the accelerator pedal 7. The rotational speed of the engine 1 is preferably detected using a crank angle sensor 23. The CVT input shaft rotational speed is preferably detected using a CVT input shaft rotational speed sensor 24 to determine the rotational speed of primary pulley 13. The CVT output shaft rotational speed is preferably detected using a CVT output shaft rotational speed sensor 25 to determine the rotational speed of the secondary pulley 14. The vehicle speed is preferably detected using a vehicle speed sensor 26. Based on this input information, the controller 21 computes the target throttle valve opening and the target gear ratio. The controller 21 then executes control of the driving force of the vehicle by using these computed values (commands) of the target throttle valve opening and the target gear ratio to control the gear shifting of the continuously variable transmission 12 and the throttle value opening (output) of the engine 1.

The controller 21 preferably includes a microcomputer with a control program that controls the driving force of the vehicle as discussed below. The controller 21 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The controller 21 is operatively coupled to the various sensing devices or sensors in a conventional manner. The internal RAM of the controller 21 stores statuses of operational flags and various control data. It will be apparent to those skilled in the art from this disclosure that the precise structure and algorithms for the controller 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
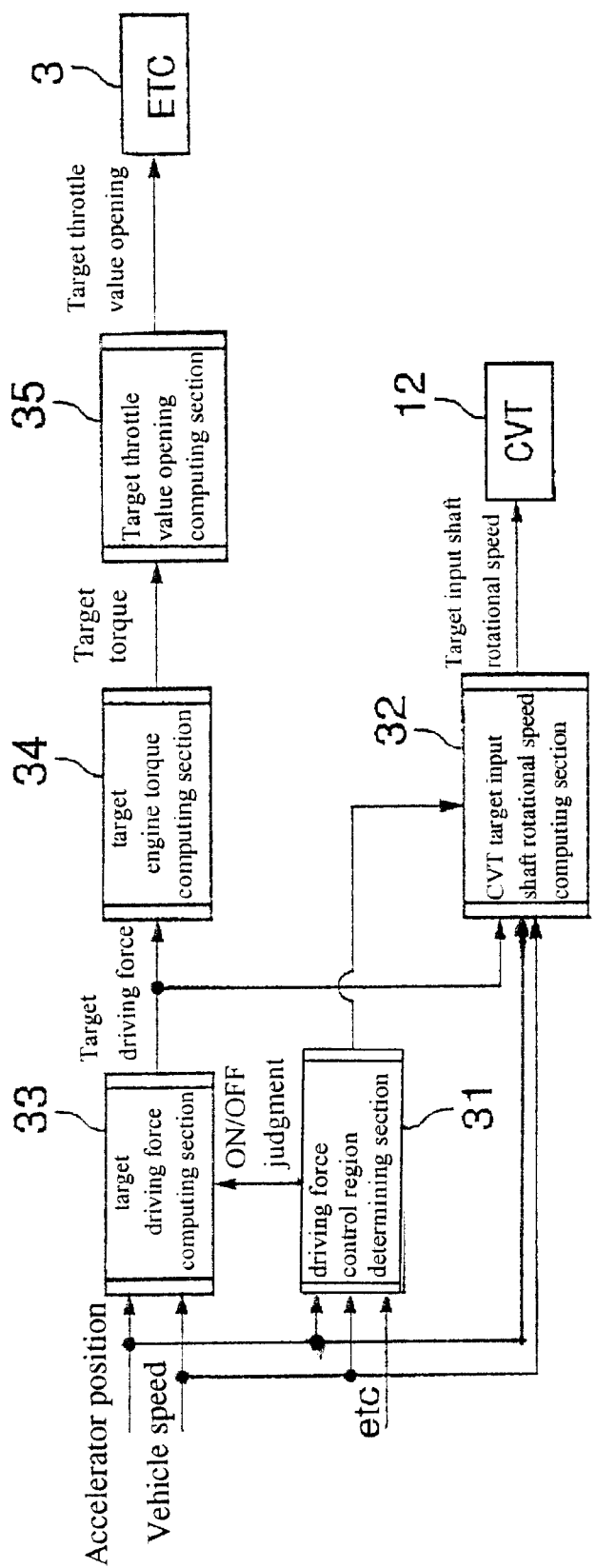
FIG. 2 a block diagram of a driving force control system for the vehicle driving force control apparatus in accordance with the first embodiment of the present invention.
Figure 3:
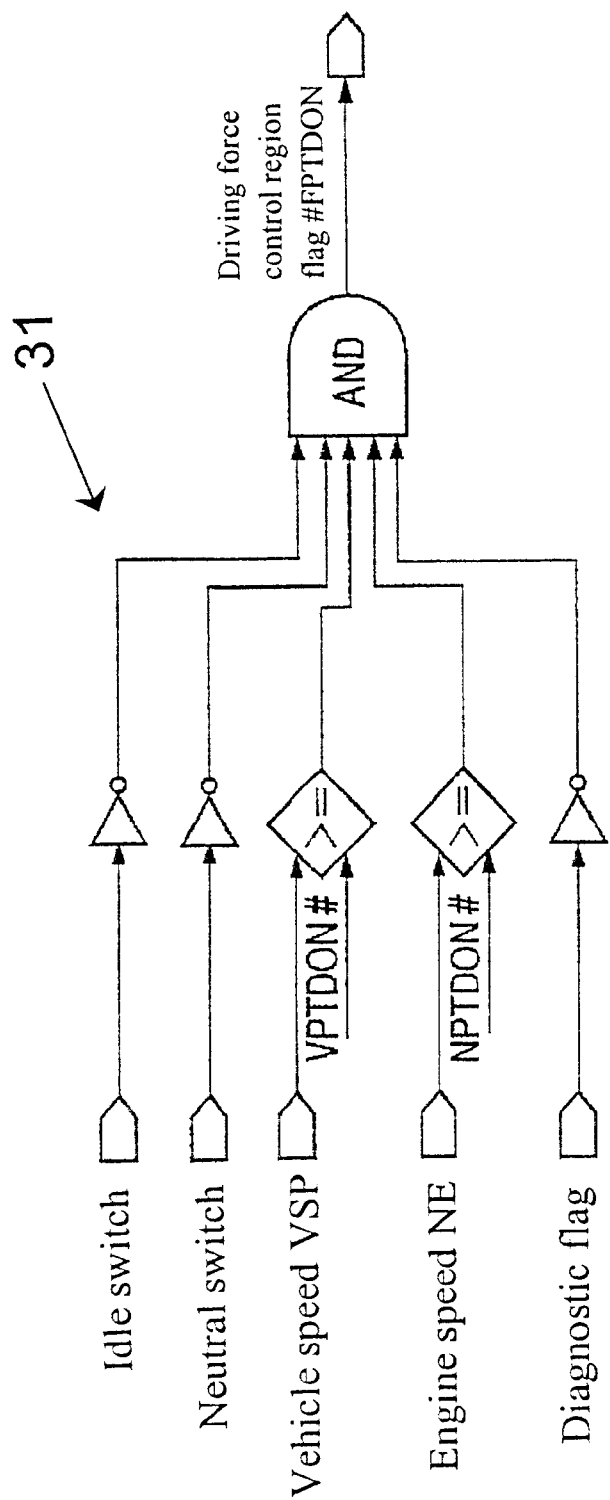
FIG. 3 is a block diagram of the driving force region determining section for the vehicle driving force control apparatus in accordance with the first embodiment of the present invention.

The details of the control program executed by the controller 21 are explained below using the block diagrams of FIGS. 2–6 and 10. FIG. 2 serves to illustrate the driving force control operation of the controller 21. In other words, the controller 21 basically has a driving force control region determining section 31, a CVT target input shaft rotational speed computing section 32, a target driving force computing section 33, a target engine torque computing section 34, and a target throttle valve opening computing section 35.

The driving force control region determining section 31 determines if the vehicle is in the region for executing the driving force control operation based on the current driving conditions of the vehicle such as accelerator pedal position and vehicle speed. This determination can be explained simply using FIG. 3. In short, the driving force control region flag #FPTDON goes to 1 when the following conditions are met:

1. Idle switch is OFF.
2. Neutral switch is OFF.
3. Vehicle speed is equal to or greater than prescribed value VPTDON#.
4. Engine rotational speed is equal to or greater than prescribed value NPTDON#.
5. Diagnostic flag=0.

When any one of conditions 1 to 5 above is not met, the value of the driving force control region flag #FPTDON goes to 0. Regarding condition 3, in this embodiment, the prescribed value VPTDON# is set to 0. Thus, in this embodiment, no vehicle speed condition exists. The accelerator pedal 7 has a predetermined range of movement with an accelerator position lower limit value APOSTL# set at a predetermined value for the characteristics of the engine 1, and an accelerator position upper limit value APOSTU# set at a predetermined value for the characteristics of the engine 1. Thus, when the accelerator position APOST is below the accelerator position lower limit value APOSTL#, the accelerator pedal 7 is considered to have been depressed a very small amount. When the accelerator position APOST is above or equal to the accelerator position upper limit value APOSTU#., the accelerator pedal 7 is considered to have been depressed a large amount.

As explained below, the driving force control apparatus is configured to prevent degradation of acceleration performance and the occurrence of large torque shock when shifting from the non-execution to the execution of a driving force control operation. A first target driving force is selected when the driving force control operation is being executed and a second target driving force is selected when the driving force control operation is not being executed. When shifting from the execution to the non-execution, the shifting target driving force is calculated such that the driving force shifts slowly. When accelerating from rest or a slow speed, the speed at which the driving force control operation shifts into the execution mode is increased as the accelerator position becomes larger. Thus, the target driving force primarily depends on the vehicle speed and the accelerator position APOST relative to the accelerator position lower limit value APOSTL# and the accelerator position upper limit value APOSTU#.

Figure 4:
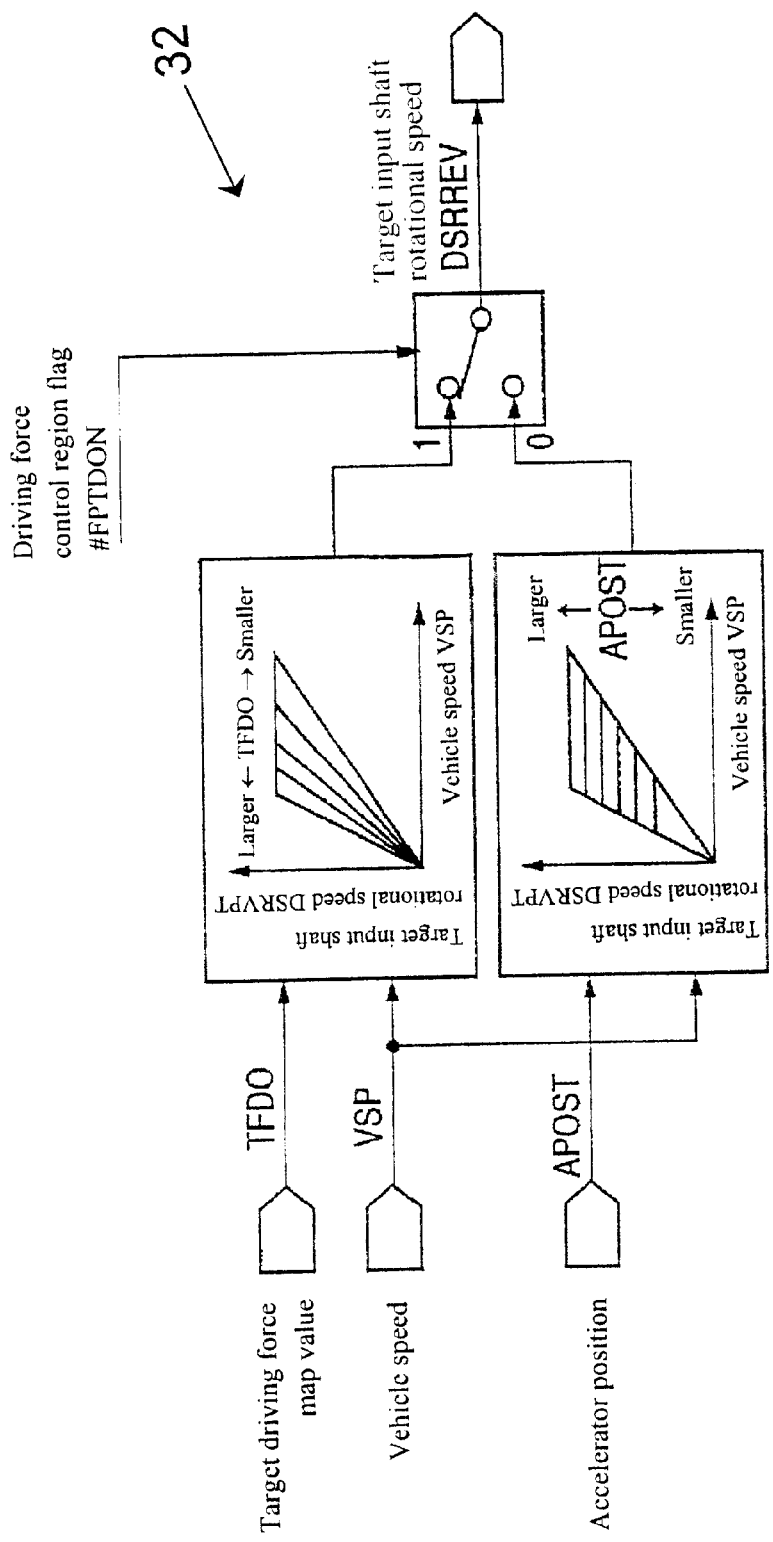
FIG. 4 is a block diagram of the target input rotational speed computing section for the vehicle driving force control apparatus in accordance with the first embodiment of the present invention.

Returning to FIG. 2, the CVT target input shaft rotational speed computing section 32 receives the determination result from the region determining section 31. Depending on the determination result from the region determining section 31, the CVT target input shaft rotational speed computing section 32 calculates the target input shaft rotational speed for either the execution or the non-execution of the driving force control operation based on the target driving force, vehicle speed, etc. This value is then used to control the gear ratio of the continuously variable transmission 12. FIG. 4 is used to briefly explain this calculation. In FIG. 4, the target input shaft rotational speed DSRREV is computed based on the target driving force map value (discussed later using FIG. 5) and the vehicle speed when the value of the aforementioned driving force control region flag #FPTDON is 1, i.e., when the vehicle is in the driving force control execution region. Conversely, the target input shaft rotational speed DSRREV is computed based on the accelerator position and the vehicle speed when the value of the aforementioned driving force control region flag #FPTDON is 0, i.e., when the vehicle is in the driving force control non-execution region.

Again returning to FIG. 2, the target driving force computing section 33 also receives the determination result from the region determining section 31 and calculates the target driving force for either the execution or the non-execution of the driving force control operation. The target engine torque computing section 34 (discussed in detail using FIG. 10) calculates the target torque of the engine based on the target driving force calculated as just described, the actual gear ratio, etc. The target throttle valve opening computing section 35 calculates the target throttle valve opening based on the target torque and the engine operating conditions. Then, the resulting value is used to control the throttle valve opening using the electronically controlled throttle device 3.

Figure 5:
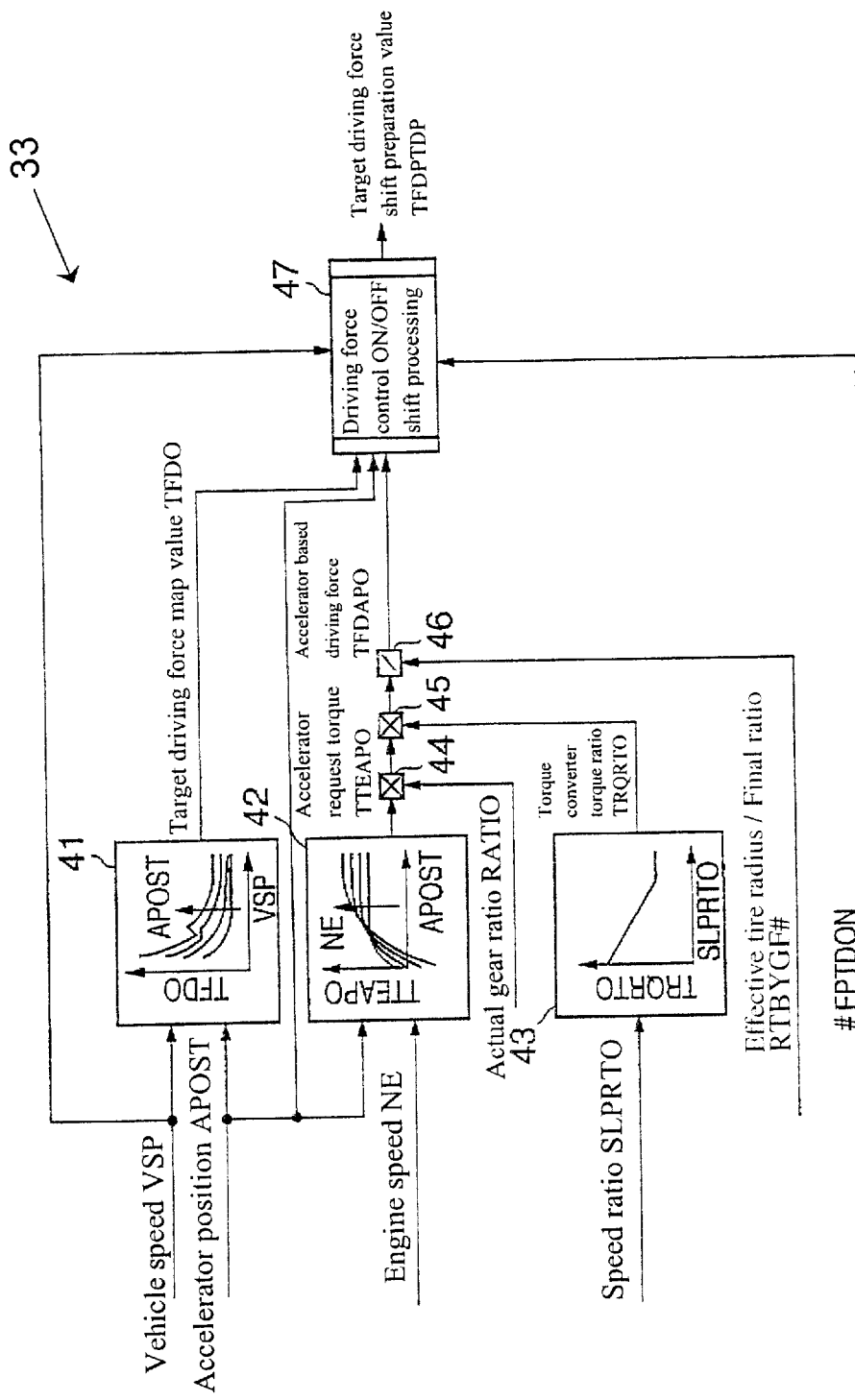
FIG. 5 is a block diagram of the target driving force computing section for the vehicle driving force control apparatus in accordance with the first embodiment of the present invention.

The details of the aforementioned target driving force computing section 33 are described using FIG. 5. In FIG. 5, the target driving force computing section 33 includes computing units 41, 42 and 43, a pair of multipliers 44 and 45, a divider 46 and a computing unit 47. The computing unit 41 finds the target driving force map value TFDO (first target driving force) by searching a prescribed map based on the driving conditions (vehicle speed and accelerator position). This target driving force map value is a value that is preset so as to obtain the optimum driving force in response to the driving conditions of the vehicle when the driving force control operation is being executed.

More specifically, the larger target driving forces are established for times when the vehicle is starting to move so that the acceleration performance at times when the vehicle is starting to move can be improved over that of vehicles that do not have the driving force control.

Meanwhile, the computing units 42 and 43, the multipliers 44 and 45, and the divider 46 constitute a second target driving force computing section. This second target driving force computing section obtains the accelerator based driving force TFDAPO (second target driving force) from the engine torque (target value or estimated value) and the actual gear ratio and the torque converter torque ratio of the continuously variable transmission 12 at the current driving conditions. The accelerator based driving force TFDAPO (second target driving force) is the driving force obtained when the engine 1 and the continuously variable transmission 12 are operated independently (i.e., during the non-execution of the driving force control operation).

More specifically, the computing unit 42 obtains the accelerator request torque TTEAPO (second target torque of the engine) by searching a prescribed map based on the accelerator position and the engine speed. The computing unit 43 obtains the torque converter torque ratio by searching a prescribed table based on the speed ratio of the torque converter. The multipliers 44 and 45 multiply the accelerator request torque by the actual gear ratio and the torque converter torque ratio, and the divider 46 divides the result by the constant RTBYGF# to obtain the accelerator based driving force TFDAPO. The constant RTBYGF# is the effective tire radius divided by the final gear ratio. This processing can be expressed with the following equation (1):

$$TFDAPO=TTEAPO \times RATIO \times TRQRTO/RTBYGF\# \qquad (1)$$

The two target driving forces (the target driving force map value, i.e., first target driving force, and the accelerator based driving force, i.e., second target driving force), the vehicle speed, and the driving force control region flag #FPTDON are all fed to the computing unit 47. The computing unit 47 calculates the shifting target driving force when the driving force control operation is shifted from the execution to the non-execution or from the non-execution to the execution. The details of the computing unit 47 are explained using FIG. 6.

The process occurring in FIG. 6 will now be described briefly. The shift rate TMFDTRN is found according to the status of the driving force control region flag #FPTDON, the time elapsed since the flag value reversed, the vehicle speed, the accelerator position, the difference between the accelerator based driving force and the target driving force map value, etc. Then, the target driving force shift preparation value TFDPTDP (shifting target driving force) is computed based on the aforementioned shift percentage. Thus, the driving force control in-progress flag #FPTDONR is generated.

Figure 6:
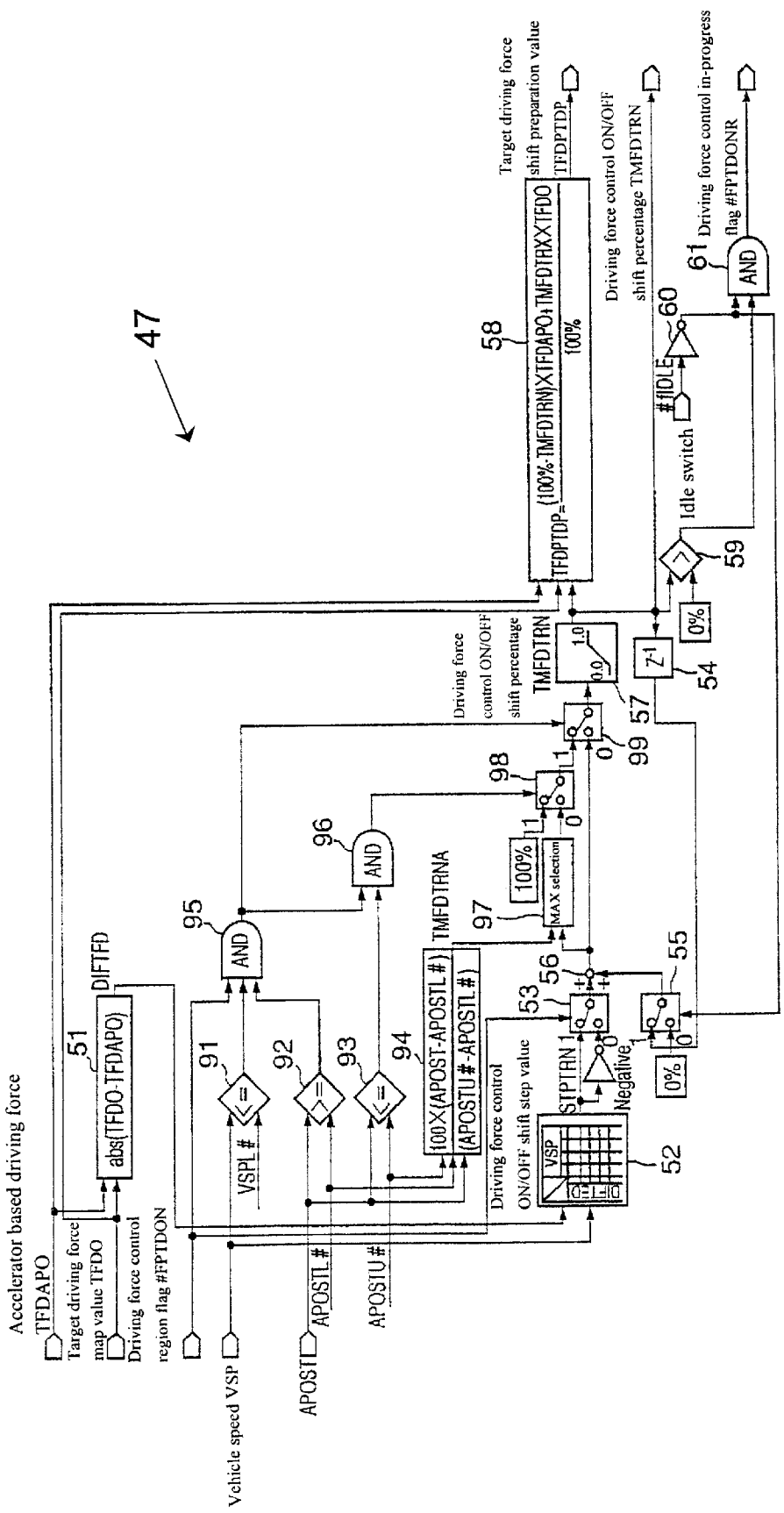
FIG. 6 is a block diagram of the shift processing for the vehicle driving force control apparatus in accordance with the first embodiment of the present invention.
Figure 7:
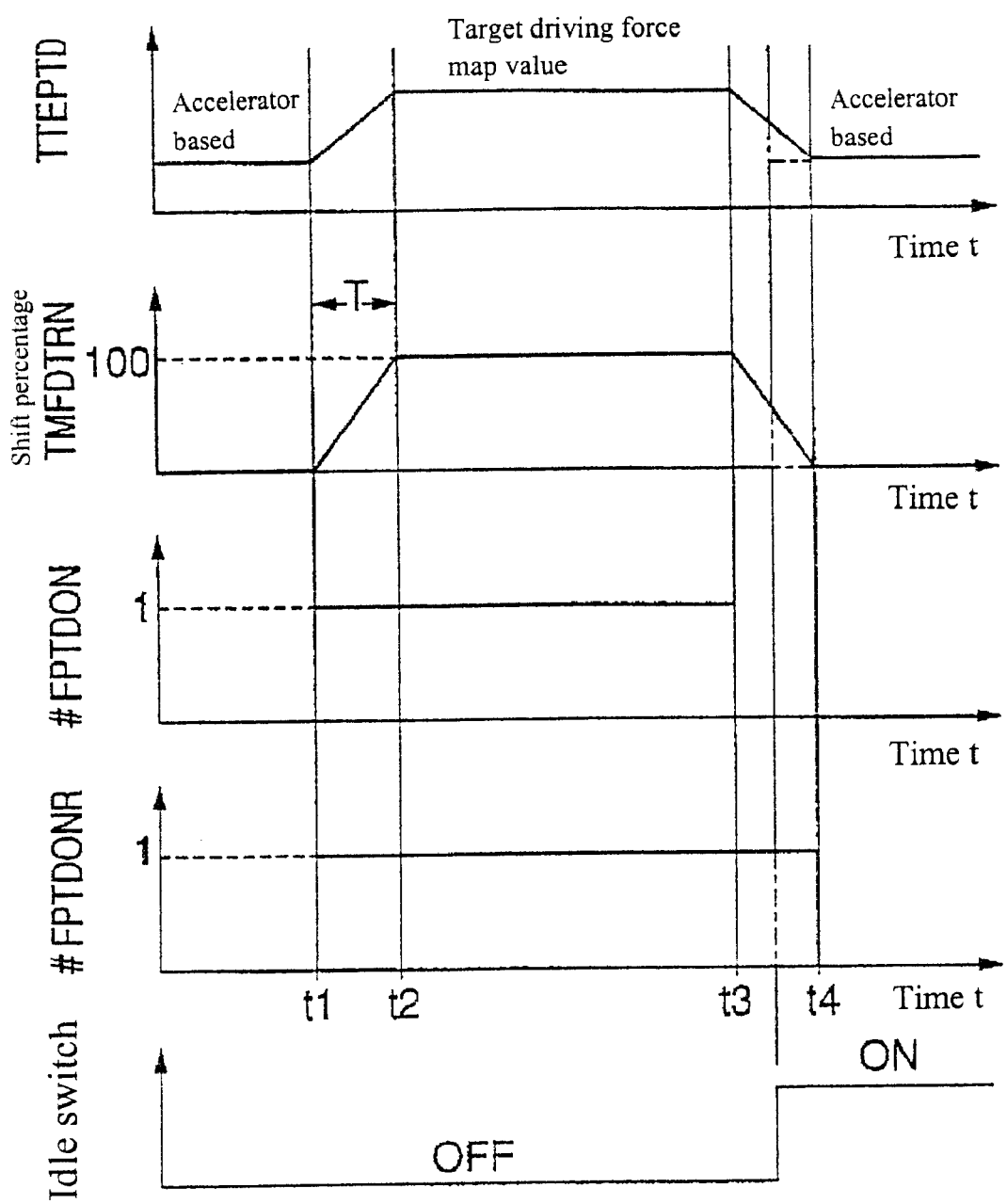
FIG. 7 is an operation timing chart of the shift processing for the vehicle driving force control apparatus in accordance with the first embodiment of the present invention.

Before discussing FIG. 6 in detail, the aforementioned processing during shifting is explained in an operation timing chart. In FIG. 7, the driving force control operation is switched from the non-execution mode to the execution mode at timing t1 and from the execution mode to the non-execution mode at timing t3. The accelerator based driving force, which is used when the driving force control operation is in the non-execution mode, is different from the target driving force map value, which is used when the driving force control operation is in the execution mode. FIG. 7 depicts a case where the target driving force map value is larger (the opposite case also occurs).

Thus, shifting of the driving force control operation into the execution mode can be thought of in the same manner as shifting into the non-execution mode. Here, assuming a case of shifting into the execution mode, the shift percentage TMFDTRN is defined as shown in the second plot of FIG. 7. Just before shifting, the shift percentage is 0%. When shifting is completed, the shift percentage is 100%. Between beginning shifting and completing shifting, the shift percentage basically increases in proportion to the amount of elapsed time. However, the time T required for shifting can be set in response to the operating conditions.

Next, the target driving force map value and the accelerator based driving force are internally divided using the shift percentage introduced as just described. The value resulting from the interior division is taken as the target driving force shift preparation value TFDPTDP (shifting target driving force) (see second plot of FIG. 8). This interior division processing can be expressed with an equation (2) as follows:

$$TFDPTDP=((100\%-TMFDTRN) \times TFDAPO+TMFDTRN \times TFDO)/100\% \qquad (2)$$

Figure 8:
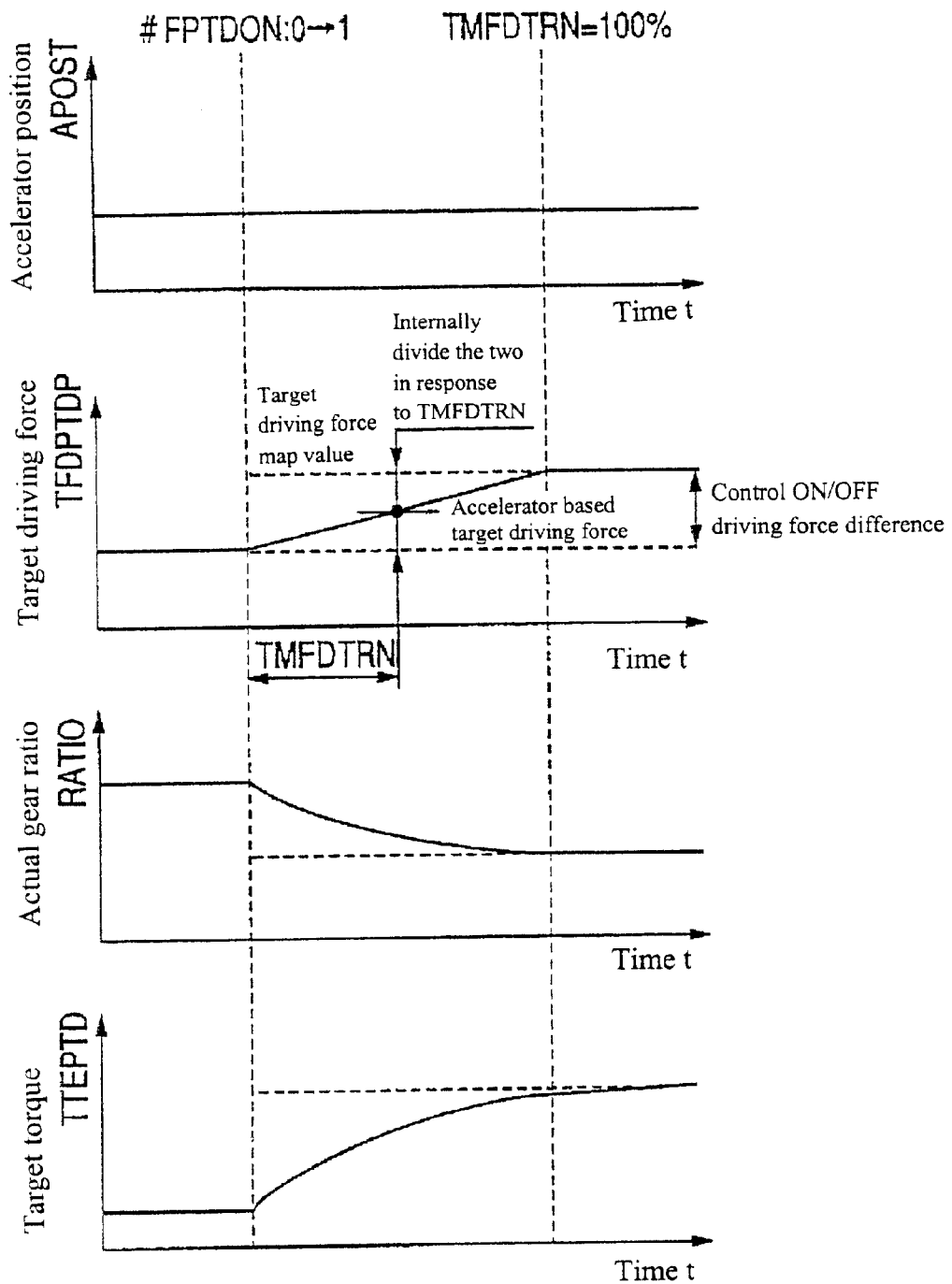
FIG. 8 is an operation timing chart of the shift for the vehicle driving force control apparatus in accordance with the first embodiment of the present invention.
Figure 9:
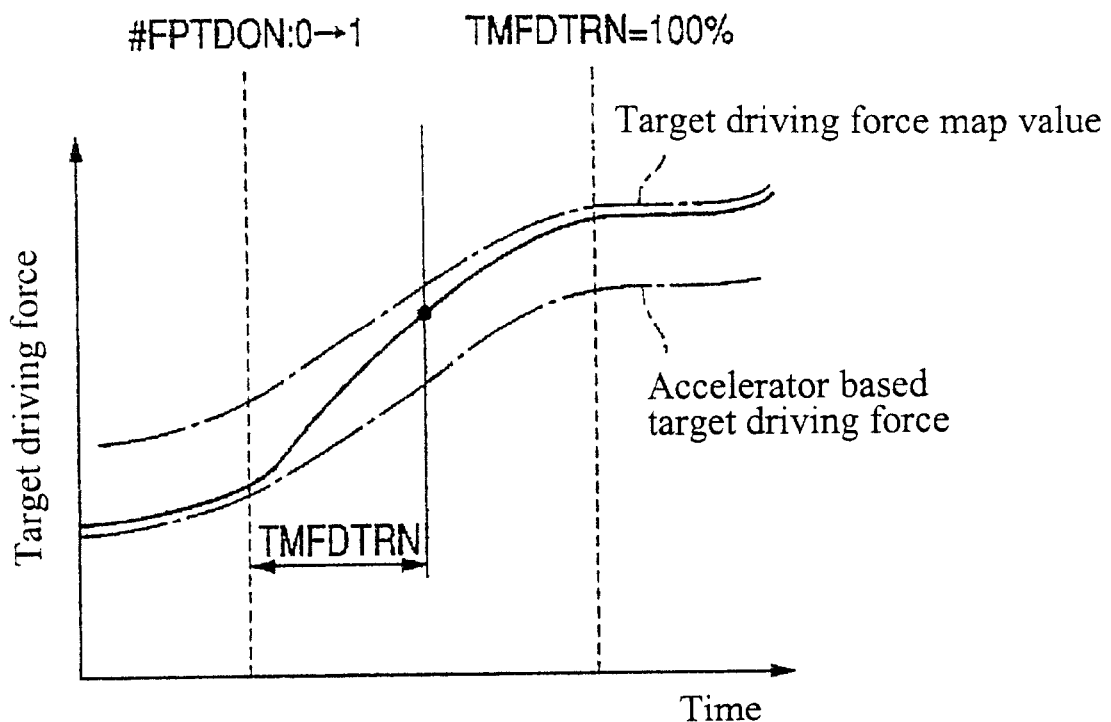
FIG. 9 is an operation timing chart of the shift processing for the vehicle driving force control apparatus in accordance with the first embodiment of the present invention.

The processing shown in the second plot of FIG. 8 is called time proportional interior division and is one type of delay processing. The merit of this time proportional interior division is that, since the time T (or the amount of change in the shift percentage TMFDTRN per prescribed amount of time) required for shifting is preset, the move from the pre-shift target driving force to the post-shift target driving force can be made reliably in the preset time T regardless of whether or not the two target driving forces (i.e., pre-shift and post shift) vary independently. For example, even if the accelerator based driving force and the target driving force map value vary independently as shown in FIG. 9, the time required for shifting will be the same if the difference between the two is the same as in FIG. 8.

In contrast, when the weighted average delay processing is used, the response time can be held fixed by making the weighted average coefficient a constant so long as prescribed conditions are used for the difference between the two target driving forces before and after shifting. However, when the two target driving forces before and after shifting vary independently, there is no choice but to vary the weighted average coefficient. When the weighted average coefficient is a variable, the time required for shifting will undergo various changes in response to independent changes in the target driving force before shifting and the target driving force after shifting. This invention does not exclude the use of weighted average processing as delay processing.

As shown in FIG. 7, another flag called the driving force control in-progress flag #FPTDONR is introduced in addition to the driving force control region flag #FPTDON for the purpose of the shift processing of the driving force control operation. The difference with respect to the driving force control region flag #FPTDON is in the turn-off timing. As will be discussed later, when the driving force control in-progress flag #FPTDONR substantially matches the accelerator based driving force, the target driving force shift preparation value changes to 0. This ends the summary of the processing during shifting.

Next, FIG. 6 will be discussed in detail. The computing unit 51 calculates the absolute value DIFTFD of the difference between the accelerator based driving force (second target force) and the target driving force map value (first target force). The value resulting from this calculation and the vehicle speed are fed to the computing unit 52, where the shift step value STPTRN (shifting speed) is obtained by searching a prescribed table.

Here, the aforementioned difference DIFTFD corresponds to the "control ON/OFF driving force difference." When this value is large, the difference between the driving forces before and after shifting to the execution or the non-execution of the driving force control operation becomes large. As a result, the operating shock occurs and affects the operability. With the present invention, the shifting speed of the shifting target driving force can vary in response to the value of the difference DIFTFD. Thus, good operability is maintained. More specifically, when the difference DIFTFD is larger, the speed of shifting from the target driving force map value to the accelerator based driving force, as well as the speed of shifting in the opposite direction, is decreased by reducing the shift step value STPTRN that is added to the shift percentage TMFDTRN. In other words, the control of the shifting target driving force varies the shift step value STPTRN (shifting speed) of the shifting target driving force based on a difference between the first target driving force and the second target driving force. In particular, when the difference between the first target driving force and the second target driving force becomes greater, the shift step value STPTRN (shifting speed) of the shifting target driving force is lowered.

Although in this embodiment the shift step value STPTRN is varied in response to the vehicle speed, it is also acceptable to add other operating conditions to achieve a more precise control.

The shift step value STPTRN from the computing unit 52 and the negative value of the shift step value—STPTRN are fed to the switch device 53. The switch device 53 outputs the positive shift step value STPTRN when the driving force control region flag #FPTDON is at 1, and outputs the negative of the shift step value—STPTRN when the flag is at 0. Meanwhile, the previous value of the shift percentage generated by the delay operator 54 and 0% are fed to the switch device 55. The switch device 55 outputs the previous value of the shift percentage when the idle switch is OFF and outputs 0% when the idle switch is ON. The adder 56 adds the outputs from the two switch devices 53 and 55, and then the result of the addition is fed to the computing unit 97 and the switch device 99.

The computing unit 94 calculates the accelerator response shift percentage TMFDTRNA based on the actual accelerator position APOST received from the accelerator sensor 22 that determines the depression amount of the accelerator pedal 7. In particular, the computing unit 94 calculates the accelerator response shift percentage TMFDTRNA based on the actual accelerator position APOST relative to the accelerator position lower limit value APOSTL#, and the accelerator position upper limit value APOSTU# using the following equation (3):

$$TMFDTRNA=100\times(APOST-APOSTL\#)/(APOSTU\#-APOSTL\#) \quad (3)$$

As the accelerator position APOST approaches the accelerator position upper limit value APOSTU#, the accelerator response shift percentage approaches 100%. The computing unit 97 outputs to the switch device 98 the larger value of the computation result from the computing unit 94 and the addition result from the adder 56.

The signals for switching the switch devices 98 and 99 are generated by the comparators 91, 92 and 93 and the AND circuits 95 and 96. More specifically, the comparator 91 receives the vehicle speed and the starting vehicle speed value VSPL# (constant) and outputs 1 when VSP≦VSPL# and 0 when VSP>VSPL#.

The comparator 92 receives the accelerator position APOST and the accelerator position lower limit value APOSTL# and outputs 1 when APOST≧APOSTL# and 0 when APOST<APOSTL#.

The comparator 93 receives the accelerator position APOST and the accelerator position upper limit value APOSTU# and outputs 1 when APOST≧APOSTU# and 0 when APOST<APOSTU#.

The AND circuit 95 receives the output from the comparators 91 and 92 and the driving force control region flag #FPTDON, and then outputs 1 only when VSP≦VSPL#, APOST≧APOSTL#, TMFDTRN>0%, and #FPTDON=1. In other words, the AND circuit 95 outputs 1 when the vehicle is in the driving force control region, the vehicle speed is slower than a prescribed valve, and the accelerator is depressed beyond a prescribed amount.

The AND circuit 96 receives the output from the AND circuit 95 and the output from the comparator 93, and then AND circuit 96 the outputs 1 only when VSP≦VSPL#, APOST≧APOSTL#, TMFDTRN>0%, #FPTDON=1, and APOST≧APOSTU#. In other words, the AND circuit 96 outputs 1 when the vehicle is in the driving force control region, the vehicle speed is slower than a prescribed valve, and the accelerator is depressed greatly beyond a prescribed amount.

These determinations regarding whether or not the vehicle speed is slower than a prescribed valve and whether or not the accelerator is depressed constitute a determination of whether the vehicle is starting to move.

The switch device 98 receives the computation result from the computing unit 97 and the value 100%. Then, the switch device 98 outputs to the switch device 99 either the value 100% when the output result from the AND circuit 96 is 1, or the computation result from the computing unit 97 when the output result from the AND circuit 96 is 0.

The switch device 99 receives the output result from the switch device 98 and the addition result from the adder 56. Then, the switch device 99 outputs to the limiting unit 57 either the output result from the switch device 98 when the output result from the AND circuit 95 is 1, or the addition result from the adder 56 when the output result from the AND circuit 95 is 0. The addition result is limited to the range 0 to 100% by the limiting unit 57.

The operation of the switch devices 53, 55, 98 and 99, the delay operator 54, the adder 56, the limiting unit 57, and the computing units 94 and 97 can be summarized as follows. First, when shifting the driving force control operation from the non-execution mode to the execution mode, the driving force control region flag #FPTDON goes to 1 and the adder 56 increases the shift percentage TMFDTRN in increments of the shift step value STPTRN using the equation (4) as follows:

$$TMFDTRN=TMFDTRN(\text{previous value})+STPTRN \quad (4)$$

Eventually the value of the shift percentage reaches 100% (this corresponds to the processing between t1 and t2 in FIG. 8).

When the vehicle is starting to move, the accelerator response shift percentage calculated by the computing unit 94 and the addition result of the adder 56 are obtained by the computing unit 97 and the switch devices 98 and 99. The larger value of these calculations is used as the shift percentage.

When the addition result of the adder 56 is already large such as when the accelerator position is small at the beginning of shifting and increases during shifting, the shift percentage will decline if it is immediately changed to the accelerator response shift percentage. In such a case, the driving force can be decreased temporarily. The computing unit 97 is used because this kind of disadvantage can be resolved by selecting the larger of the two values.

When the accelerator position is large and while the vehicle is starting to move, the value 100% that is selected by the switch device 98 is used as the shift percentage instead of the addition result from the adder 56. In other words, the shift percentage is larger than normal when the vehicle is starting to move and the shift percentage goes immediately to 100% when the accelerator position is equal to or larger than the accelerator position upper limit value APOSTU#. For example, in a four liter engine with a total amount of depression of the accelerator pedal 7 being approximately eighty degrees, the accelerator position upper limit value APOSTU# can be set to approximately six degrees. Generally, the accelerator position upper limit value APOSTU# will be set to a value that is approximately smaller than ⅛ of the total amount of depression of the accelerator pedal 7.

Meanwhile, when shifting the driving force control operation from the execution mode to the non-execution mode, the driving force control region flag #FPTDON goes to 0 and the adder 56 decreases the shift percentage TMFDTRN in increments of the shift step value STPTRN using the following equation:

$$TMFDTRN=TMFDTRN(\text{previous value})-STPTRN \quad (5)$$

Eventually the value of the shift percentage reaches 0% (this corresponds to the processing between t3 and t4 in FIG. 7).

Next, the computing unit 58, which receives the shift percentage obtained as just described, calculates the target driving force shift preparation value TFDPTDP by time proportional interior division using the two target driving forces (i.e., pre-shift and post-shift) and the aforementioned equation (2).

Meanwhile, the driving force control in-progress flag #FPTDONR is generated from the comparator 59, the idle switch signal inverter 60, and the AND circuit 61. More specifically, the comparator 59 receives shift percentage TMFDTRN and 0% and outputs 1 when TMFDTRN>0% and 0 when TMFDTRN=0%. Then, the AND circuit 61 receives the output from the comparator 59 and the inverse of the idle switch signal and outputs 1 as the driving force control in-progress flag #FPTDONR only when TMFDTRN>0% and the idle switch is OFF. In other words, the driving force control in-progress flag #FPTDONR goes to 0 when (1) the shift percentage TMFDTRN=0% or (2) the idle switch is ON.

However, in a case where the idle switch turns ON in the midst of the shift percentage being calculated, the shift percentage will go to 0% immediately. The reason is that, in such a case, the driving force control region flag #FPTDON goes to 0 and, consequently, -STPTRN% (where STPTRN is greater than 0) is outputted from the switch device 53 and 0% is outputted from the switch device 55. When these two values are added by the adder 56, the result is -STPTRN% and the limiting unit 57 limits the shift percentage to 0%. As a result, the target driving force shift preparation value TFDPTDP outputted from the computing unit 58 is the accelerator based driving force exactly. In short, when the driving force control operation is shifting from the execution mode to the non-execution mode and the idle switch turns ON in the midst of calculating the shift percentage, the target driving force shift preparation value immediately becomes the accelerator based driving force and the driving force control in-progress flag #FPTDONR goes immediately to 0 (see the dotted line in FIG. 7).

There is a reason that the target driving force is immediately returned to the accelerator based driving force when the idle switch turns ON in the midst of calculating the shift percentage. As explained earlier, the engine target torque goes negative in regions where the target driving force goes negative due to deceleration (the idle switch ON). In general, the engine torque control precision is poorer in negative regions than in regions where the target driving force is positive. Often times engine brake control by device of gear ratio control only provides a better deceleration rate than the application of the driving force control operation in the deceleration region. In view of this reality, when the vehicle decelerates, the present invention immediately sets the driving force control operation to the non-execution mode and returns the target driving force to the accelerator based driving force. Then, the present invention shifts to a well known engine brake to achieve a desirable deceleration rate as disclosed, for example, in Japanese Laid-Open Patent Publication Nos. 9-267664 and 6-87356.

Figure 10:
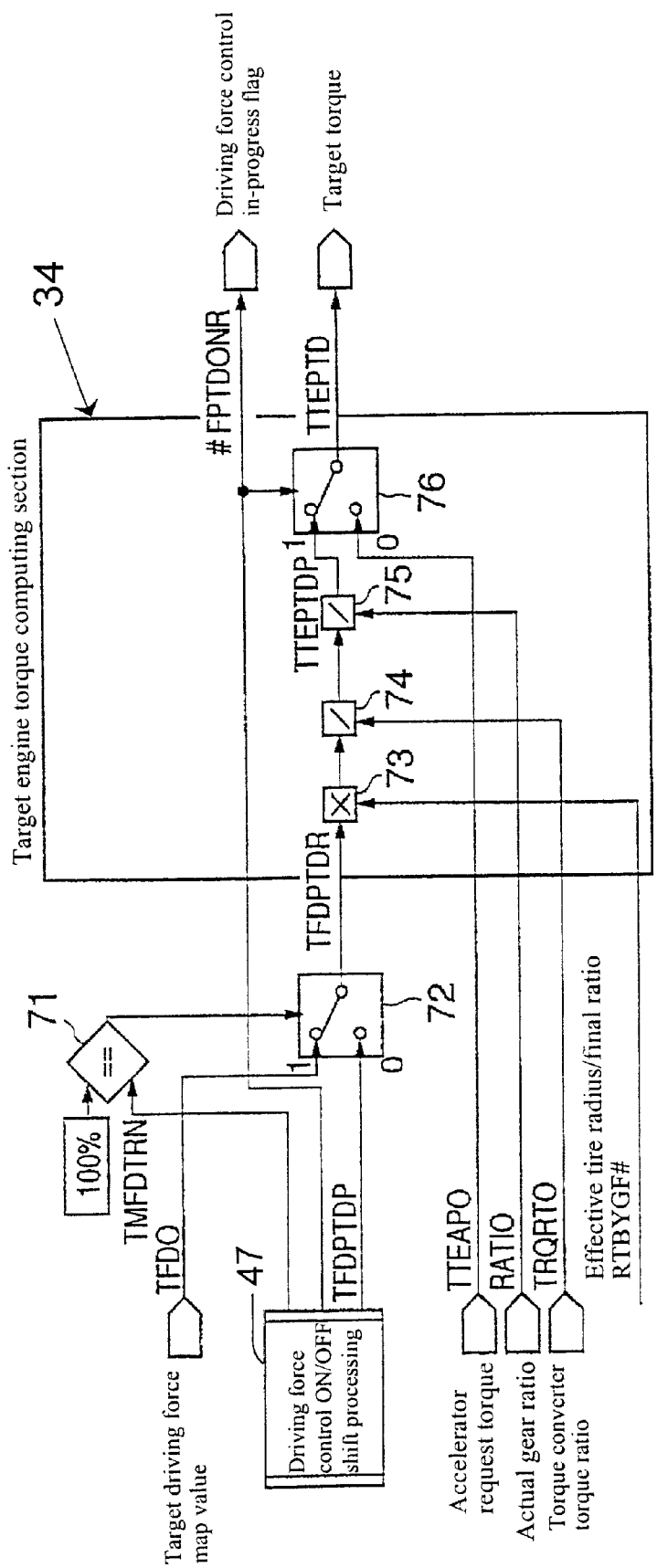
FIG. 10 is a block diagram of the target engine torque computing section for the vehicle driving force control apparatus in accordance with the first embodiment of the present invention.

FIG. 10 shows the details of the target engine torque computing section 34 from FIG. 2. In FIG. 10, the comparator 71 and the switch device 72 constitute a switching device that switches from the target driving force shift preparation value to the target driving force map value when the shift percentage reaches 100%. More specifically, the comparator 71 compares the shift percentage with 100%. The switch 72 receives the result of the comparison and outputs the target driving force shift preparation value as the target driving force when the shift percentage is less than 100% (i.e., during shifting) and the target driving force map value as the target driving force when the shift percentage is 100% (because the driving force control operation goes into the execution mode). The reason the target driving force shift preparation value is replaced by the target driving force map value as the target driving force when the driving force control operation is fully into the execution mode (shift percentage=100%) is explained later.

The multiplier 73 and the dividers 74 and 75 calculate the engine target torque (first target torque) from the target driving force using the exact opposite calculation procedure as was used to find the accelerator based driving force from the accelerator request torque (explained earlier using FIG. 5). More specifically, the multiplier 73 and the dividers 74 and 75 perform the following calculation with respect to the target driving force TFDPTDR to find the target torque shift preparation value TTEPTDP:

$$TTEPTDP = TFDPTDR \times RTBYGF\#/(TRQRTO \times RATIO) \qquad (6)$$

Here, RATIO is the actual gear ratio, TRQRTO is the torque converter torque ratio, and RTBYGF# is the effective tire radius divided by the final gear ratio.

The switch 76 receives the target torque shift preparation value and accelerator request torque, and then the switch 76 outputs as the target torque of the engine either the target torque shift preparation value when the driving force control in-progress flag #FPTDONR is 1, or the accelerator request torque when the driving force control in-progress flag #FPTDONR is 0.

When the driving force control in-progress flag #FPTDONR is 0, the target torque (shift preparation value) is not calculated and the accelerator request torque is outputted as the target torque of the engine. The reason is as follows. When the driving force control operation is completely in the non-execution mode (i.e., the driving force control in-progress flag #FPTDONR=0), the accelerator request torque becomes the target torque. Therefore, if the accelerator based torque were calculated from the accelerator request torque in FIG. 6 and then the target torque (shift preparation value) were calculated by the multiplier 73 and the dividers 74 and 75 in FIG. 11 using the exact opposite calculation procedure, one would expect, in terms of logic, this target torque (shift preparation value) to match the accelerator request torque. In reality, however, the rounding error and the like occurs in the computation process that takes place in the multiplier 73 and the dividers 74 and 75. Therefore, when the driving force control operation is completely in the non-execution mode, the accelerator request torque is outputted as is as target torque in order to eliminate the influence of the rounding error and the like that occurs in the computation process.

For the same reason, the comparator 71 and the switch device 72 output the target driving force map value instead of the target driving force shift preparation value as the target driving force when the driving force control operation is completely in the execution mode (shift percentage 100%). That is, if the target driving force shift preparation value were found by calculating the shift percentage and performing interior division even when the driving force control operation is completely in the execution mode, one would expect, in terms of logic, this target driving force shift preparation value to match the target driving force map value. In reality, however, rounding error and the like occur in the interior division process. Therefore, the when the driving force control operation is completely in the execution mode, the target driving force map value is outputted as is as target driving force in order to eliminate the influence of rounding error and the like that occur in the interior division process.

Figure 11:
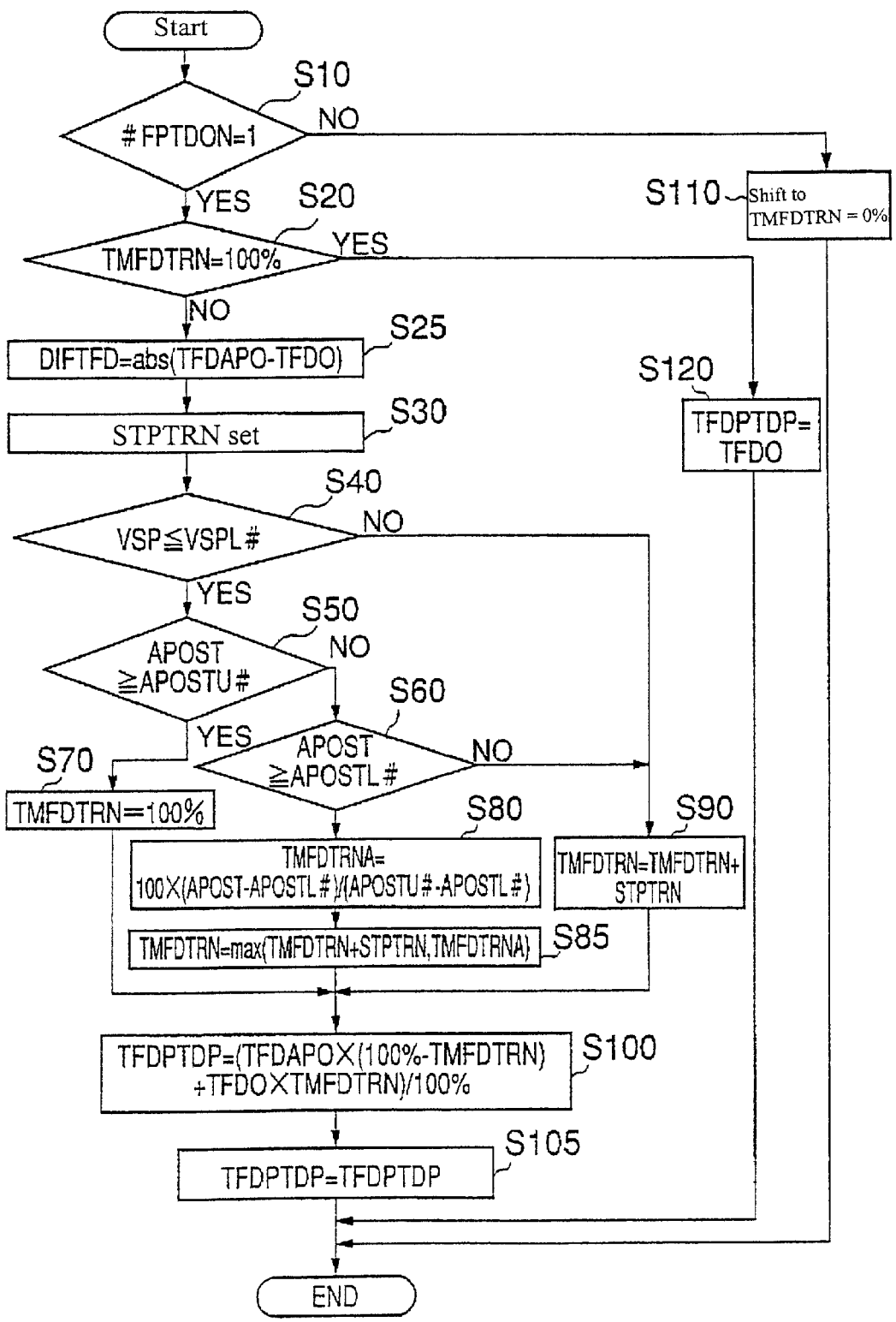
FIG. 11 is a flowchart for explaining the calculation of the target driving force and the shift percentage for the vehicle driving force control apparatus in accordance with the first embodiment of the present invention.

Regarding the driving force control operation described above, FIG. 11 shows a flowchart illustrating the key components of the processing for shifting to the driving force control operation in the present invention. FIG. 11 is for performing the computations for the two target driving forces and the shifting processing for the driving force control operation described previously in reference to FIGS. 5, 6, and 10. The flowchart is executed according to a fixed time interval (e.g., every 10 ms). Although the processing illustrated in FIG. 11 overlaps with the information covered previously in reference to the block diagrams, it is explained here nevertheless. If the driving force control region flag #FPTDON is 1 at step S10, then the control proceeds to step S20. However, the control proceeds to step S110 when #FPTDON is 0. Step S110 performs the control that shifts the shift percentage to 0%, but explanation of this portion is omitted because it is the same as conventional technology.

At step S20 the shift percentage TMFDTRN is compared with 100%. If the shift percentage is not 100% (i.e., shifting is in progress), then control proceeds to step S25 and the succeeding steps. Finally, at step S105, the target driving force shift preparation value (shifting target driving force) TFDTDP that was obtained at step S100 is inserted as the target driving force TFDPTDR. When the shift percentage becomes 100% (the driving force control operation is being executed), the control then proceeds to step S120 and the target driving force map value (first target driving force) TFDO is inserted as the target driving force TFDPTDR.

The absolute value DIFTFD of the difference between the accelerator based driving force TFDAPO and the target driving force map value TFDO is found at step S25 and used along with the vehicle speed VSP in step S30 to calculate the shift step value (shifting speed) STPTRN by searching a prescribed shifting speed table.

The subsequent steps S40 to S90 serve to calculate the shift percentage TMFDTRN.

Step S40 compares the vehicle speed VSP with the starting vehicle speed value VSPL#. Unless VSP≦VSPL# (i.e., unless the vehicle speed is high and the vehicle is not in a state of starting to move), then control proceeds to step S90. At step S90, the shift step value (shifting speed) STPTRN found in step S30 is added to the previous shift percentage TMFDTRN and the resulting value is inserted as the new shift percentage TMFDTRN.

If VSP≦VSPL#, i.e., if the vehicle speed is low such that the vehicle is determined to be in a state of starting to move, control proceeds to step S50.

Step S50 compares the accelerator position APOST with the accelerator upper limit value APOSTU#. If APOST≧APOSTU, i.e., if the accelerator position APOST is determined to be extremely large, then control proceeds to step S70 where step S70 sets the shift percentage TMFDTRN to 100%.

When APOST is not ≧APOSTU, control proceeds to step S60.

Step S60 compares the accelerator position APOST and the accelerator lower limit value APOSTL#. If APOST is not ≧APOSTL, i.e., if the accelerator position APOST is determined to be extremely small, then control proceeds to step S90 as when not in a state of starting to move.

When APOST≧APOSTU, i.e., when the vehicle is starting to move and some acceleration is required, then control proceeds to step S80.

Step S80 calculates the accelerator response shift percentage TMFDTRNA using the aforementioned equation. Then, step S85 sets as the new shift percentage TMFDTRN the larger between the value obtained by adding the previous shift percentage TMFDTRN to the shift step value (shifting speed) STPTRN found in step S30 and the accelerator response shift percentage TMFDTRNA.

Here, the accelerator response shift percentage TMFDTRNA is a value that approaches 100 as the accelerator position APOST approaches the accelerator upper limit value APOSTU# and approaches 0 as the accelerator position approaches the accelerator lower limit value APOSTL#. In short, it is a value that increases as the driver's intention to accelerate increases.

Step S100 uses the shift percentage TMFDTRN obtained from the previous step and the aforementioned equation (2) to perform interior division on the two target driving forces (pre-shift and post-shift), i.e., the accelerator based driving force TFDAPO and the target driving force map value TPDO, and determines the target driving force shift preparation value (shifting target driving force) TFDPTDP. Then step S105 sets this value as the target driving force TFDPTDR.

Figure 12:
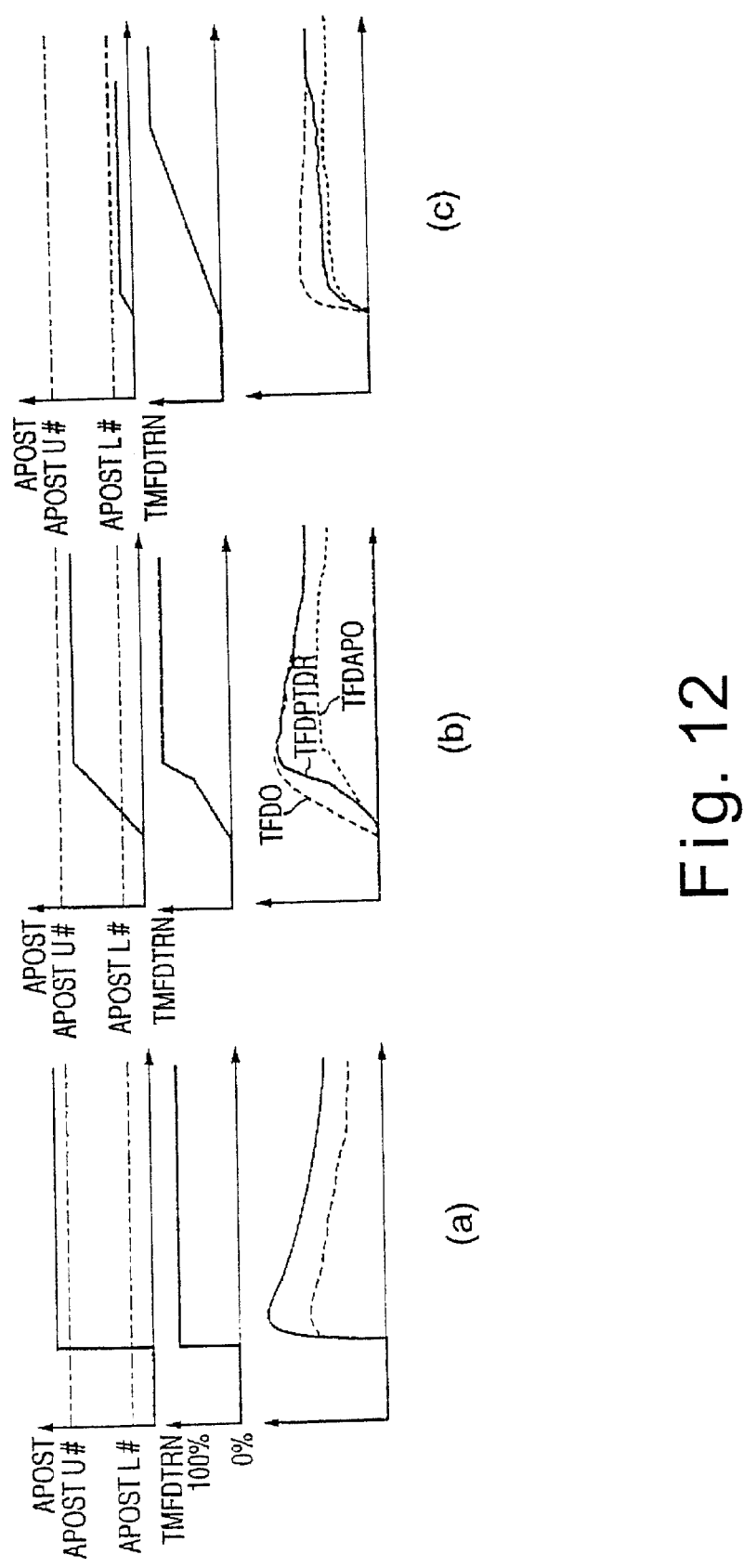
FIG. 12 is an operation time chart illustrating the change in target driving force of the vehicle driving force control apparatus in accordance with the first embodiment of the present invention.

FIG. 12 shows how the shift percentage TMFDTRN and target driving force TFDPTDR change when the accelerator position is changed in various ways at the time of starting into motion.

In case (a) of FIG. 12, the accelerator pedal is depressed beyond the accelerator upper limit value. In case (b) of FIG. 12, the accelerator pedal is depressed beyond the accelerator lower limit but below the accelerator upper limit. In case (c) of FIG. 12, the accelerator pedal is barely depressed at all. In case (a) of FIG. 12, the shift percentage goes immediately to 100% and the target driving force map value TPDO becomes the target driving force. In case (b) of FIG. 12, the shift percentage is small at first but, as the accelerator position increases, the effect of the accelerator response shift percentage causes the shift percentage to increase more quickly and the target driving force rapidly approaches the target driving force map value. In case (c) of FIG. 12, the target driving force approaches the target driving force map value gradually, similarly to the prior art.

With this kind of embodiment of the present invention, the torque shock that accompanies the torque difference between the torque before shifting and the torque after shifting can be avoided without degrading the starting acceleration performance. This can be accomplished because the target driving force at times when the driving force control operation is shifting from the non-execution to the execution is shifted gradually from the accelerator based driving force to the target driving force map value in such a manner that the larger the accelerator position is when the vehicle is starting to move, the faster the shift to the target driving force map value will be.

Although a continuously variable transmission was used as the transmission in this embodiment, the present invention is not limited to such a transmission and a step-shifting automatic transmission may also be used.

The term "configured" as used herein to describe a component, section or part of a device includes hardware and/or software that is constructed and/or programmed to carry out the desired function.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-395224. The entire disclosure of Japanese Patent Application No. 2000-395224 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus comprising:
   at least one sensing device configured to detect at least one driving condition of a vehicle;
   a determining section configured to determine if a driving force control operation should be executed based on the at least one driving condition detected by the at least one sensing device;
   a switching section configured to switch to between an execution mode and a non-execution mode of the driving force control operation based on a result of the determining section;
   a first target driving force computing section configured to calculate a first target driving force based on the at least one driving condition detected by the at least one sensing device;
   a first target torque computing section configured to calculate a first target torque based on the first target driving force and the at least one driving condition detected by the at least one sensing device;
   a second target torque computing section configured to calculate a second target torque based on engine speed and the at least one driving condition detected by the at least one sensing device;
   a selecting section configured to select the first target torque when the switching section switches to the execution mode of the driving force control operation and the second target torque when the switching section switches to the non-execution mode of the driving force control operation;
   an engine output torque controlling device configured to control engine output torque based on which of the first and second target torques has been selected by the selection section;
   a second target driving force computing section configured to calculate a second target driving force that is obtained when the second target torque has been selected by the selection section;
   a shifting target driving force computing section configured to calculate a shifting target driving force to gradually shift from the second target driving force to the first target driving force when the driving force control operation is shifted from the non-execution mode to the execution mode; and
   a shift controlling section configured to switch from the second target driving force to the shifting target driving force when the driving force control operation is shifted from the non-execution mode to the execution mode,
   the shift controlling section being further configured to increase shifting speed of the shifting target driving force in response to an increase in an accelerator pedal depression amount upon detection of the vehicle starting to move.

2. The vehicle driving force control apparatus as recited in claim 1, wherein
   the detection of the vehicle starting to move is detected based on the accelerator pedal depression amount and the vehicle speed.

3. The vehicle driving force control apparatus as recited in claim 2, wherein
   the shifting target driving force computing section further calculates the second target driving force and the first target driving force using time proportional interior division processing.

4. The vehicle driving force control apparatus as recited in claim 3, wherein
   the shifting target driving force computing section varies the shifting speed of the shifting target driving force based on a difference between the first target driving force and the second target driving force such that when the difference between the first target driving force and the second target driving force becomes greater, the shifting speed of the shifting target driving force is lowered.

5. The vehicle driving force control apparatus as recited in claim 4, wherein
   the shifting target driving force computing section immediately sets the shifting target driving force to the first target driving force when the accelerator pedal depression amount is greater than or equal to a prescribed amount upon detection of the vehicle starting to move.

6. The vehicle driving force control apparatus as recited in claim 5, wherein
   the shifting target driving force computing section selects a larger value of a calculation performed by time proportional interior division processing on the second target driving force and the first target driving force and a calculation performed by interior division processing using a ratio based on the accelerator pedal depression amount upon detection of the vehicle starting to move.

7. The vehicle driving force control apparatus as recited in claim 1, wherein
   the shifting target driving force computing section further calculates the second target driving force and the first target driving force using time proportional interior division processing.

8. The vehicle driving force control apparatus as recited in claim 1, wherein
   the shifting target driving force computing section varies the shifting speed of the shifting target driving force based on a difference between the first target driving force and the second target driving force such that when the difference between the first target driving force and the second target driving force becomes greater, the shifting speed of the shifting target driving force is lowered.

9. The vehicle driving force control apparatus as recited in claim 1, wherein the shifting target driving force computing section immediately sets the shifting target driving force to the first target driving force when the accelerator pedal depression amount is greater than or equal to a prescribed amount upon detection of the vehicle starting to move.

10. The vehicle driving force control apparatus as recited in claim 1, wherein the shifting target driving force computing section selects a larger value of a calculation performed by time proportional interior division processing on the second target driving force and the first target driving force and a calculation performed by interior division processing using a ratio based on the accelerator pedal depression amount upon detection of the vehicle starting to move.

11. A vehicle driving force control apparatus comprising:

sensing means for detecting driving conditions of a vehicle;

determining means for determining if the vehicle is in a region for executing a driving force control operation based on the driving conditions;

switching means for switching between an execution mode and non-execution mode of a driving force control operation based on the determining means;

computing means for calculating a first target driving force based on the driving conditions, a first target torque based on the first target driving force and the driving conditions, a second target torque based on the engine speed and the driving conditions, a second target driving force when the second target torque is selected, and a shifting target driving force that gradually shifts from the second target driving force to the first target driving force when the driving force control operation is shifted from the non-execution mode to the execution mode;

selection means for selecting the first target torque when the switching means switches to the execution mode of the driving force control operation and the second target torque when the switching means switches to the non-execution mode of the driving force control operation;

engine output torque means for controlling output torque of the engine based on which of the first and second target torque has been selected by the selection means;

shift controlling means for switching from the second target driving force to the shifting target driving force when the driving force control operation is shifted from the non-execution mode to the execution mode, the shift controlling means being configured to increase shifting speed of the shifting target driving force in response to an increase in an accelerator pedal depression amount upon detection of the vehicle starting to move.

12. The vehicle driving force control apparatus as recited in claim 11, wherein the detection of the vehicle starting to move is detected based on the accelerator pedal depression amount and the vehicle speed.

13. The vehicle driving force control apparatus as recited in claim 11, wherein the computing section further calculates the second target driving force and the first target driving force using time proportional interior division processing.

14. The vehicle driving force control apparatus as recited in claim 11, wherein the shifting target driving force computing section varies the shifting speed of the shifting target driving force based on a difference between the first target driving force and the second target driving force such that when the difference between the first target driving force and the second target driving force becomes greater, the shifting speed of the shifting target driving force is lowered.

15. The vehicle driving force control apparatus as recited in claim 11, wherein the computing section immediately sets the shifting target driving force to the first target driving force when the accelerator pedal depression amount is greater than or equal to a prescribed amount upon detection of the vehicle starting to move.

16. The vehicle driving force control apparatus as recited in claim 11, wherein the shifting target driving force computing section selects a larger value of a calculation performed by time proportional interior division processing on the second target driving force and the first target driving force and a calculation performed by interior division processing using a ratio based on the accelerator pedal depression amount upon detection of the vehicle starting to move.

* * * * *